June 18, 1957          F. G. PRESNELL          2,796,080
FLUID METERING SHUT-OFF VALVE
Filed April 8, 1952
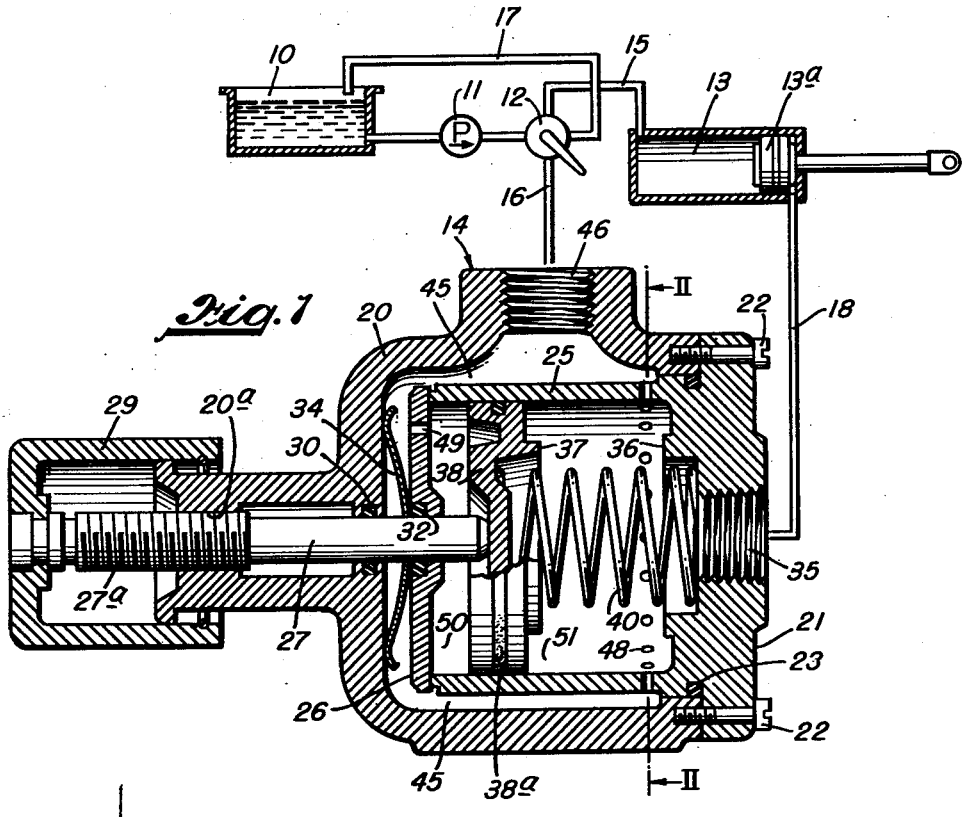
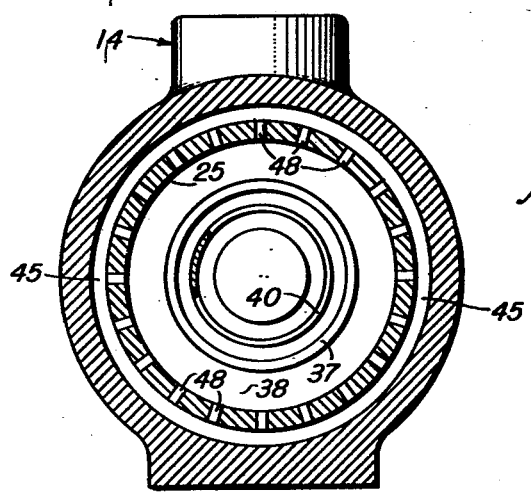
INVENTOR.
Frank G. Presnell
BY
ATTORNEY

2,796,080
Patented June 18, 1957

2,796,080

FLUID METERING SHUT-OFF VALVE

Frank G. Presnell, Hollywood, Calif., assignor to Bendix Aviation Corporation, North Hollywood, Calif., a corporation of Delaware Application April 8, 1952, Serial No. 281,143

6 Claims. (Cl. 137—620)

This invention relates to devices for adjustably predetermining the stroke of a hydraulic motor and more specifically to fluid-metering shut-off valves for this purpose.

An object of the invention is to provide a simple, inexpensive and reliable fluid-metering shut-off valve, the accuracy of which is substantially independent of the viscosity of the fluid and the rate of flow.

A further object of invention is to incorporate in a fluid-metering shut-off valve a plurality of identical apertures in the main flow line or passage and a lesser number of identical apertures in the branch flow line or passage, said identical apertures having the same flow characteristics at any viscosity and rate of flow of fluid so that the fluid flow in each passage is alway proportional to the ratio of the number of holes in one passage to the number of holes in the other passage.

Other more specific objects and features of the invention will appear from the description to follow.

It is old to employ as a fluid-metering shut-off valve a cylinder through which the entire flow is conducted, with a piston in the cylinder that moves proportional to the flow of fluid therethrough and stops the flow when it reaches the end of its stroke. Such devices have the disadvantage that the cylinder must be relatively large so as to have the same volumetric capacity as the motor cylinder that is to be controlled. Many attempts have been made to decrease the size of such fluid-metering valves by by-passing the main portion of the fluid, and admitting only a small portion thereof to a metering cylinder which can thereby be made much smaller than the motor that is to be controlled. The main difficulty in designing such devices has been to provide a practical and simple flow dividing device that will accurately proportion the fluid going to the movable piston under varying conditions of viscosity of the fluid and varying rates of flow. The simplest form of flow divider is simply two orifices, or apertures, of different size, the larger aperture constituting the bypass passage, and the smaller aperture admitting fluid to the control piston. The defect of such simple devices is that two apertures of different sizes do not have flow characteristics of the same ratio at different viscosities of the fluid and different rates of flow.

This problem is solved in accordance with the present invention by providing a plurality of apertures in the main flow line and a lesser number of apertures in the branch line, and making all of the apertures identical. Because of the fact that all of the apertures are identical they all have the same flow characteristics at any viscosity and rate of flow, and the flow in each passage is always proportional to the ratio of the number of holes in one passage to the number of holes in the other passage. With this arrangement the individual holes or apertures can be of any desired cross-sectional shape and size, and any desired length, thereby greatly simplifying manufacture.

In the drawing:

Fig. 1 is a longitudinal section through a valve in accordance with the invention, with a schematic diagram of a hydraulic system in which it may be employed; and Fig. 2 is a cross-section taken in the plane II—II of Fig. 1.

Referring to Fig. 1, the hydraulic system therein depicted comprises a fluid reservoir 10, a pump 11, a four-way selector valve 12, a motor cylinder 13, and a valve 14 in accordance with the invention. The selector valve 12 can be manipulated to either connect the output of the pump 11 to a line 16 and connect the line 15 to the return line 17, or, vice versa, connect the line 15 to the output of the pump 11 and connect the line 16 to the return line 17. Line 15 is connected to the left end of the cylinder 13, and the right end of the cylinder is connected by a line 18 through the valve 14 to the line 16, so that the motor cylinder 13 and the valve 14 are connected in series, and, if the valve 14 is closed, flow through the circuit including the motor cylinder 13 is blocked, and the motor piston 13a is stopped. As will appear from the description to follow, the valve 14 permits free and unlimited flow of fluid from the line 18 to the line 16, but closes in response to flow of a predetermined volume of fluid therethrough from the line 16 to the line 18. The result is that when pressure fluid is applied to the line 15 from the selector valve 12 the motor piston 13a is actuated into its right limit position, but when the selector valve 12 is positioned to apply pressure fluid to the line 16, the valve 14 closes after a predetermined volume of fluid has flowed therethrough to stop the piston 13a in some intermediate position determined by the adjustment of the valve 14.

The valve 14 comprises an outer casing 20 having an end closure cap 21 which may be secured thereto, as by screws 22, and sealed with a gasket or sealing ring 23. The cap 21 has formed integrally therewith and extending into the casing 20 a cylindrical wall 25, the inner end of which is normally closed by a cap 26 which is guided for axial movement on an adjusting rod 27, which extends through the casing 20 to the exterior thereof and is provided with a knob 29 on its outer end. A threaded portion 27a of the rod 27 engages a threaded portion 20a of the outer casing 20 through which it extends, and the rod may be sealed against fluid leakage by a sealing ring 30. The cap 26 may also be sealed with respect to the rod 27 by a sealing ring 32.

As will appear later, the cap 26 is movable away from the end of the cylinder 25 in response to fluid pressure, to function as a check valve and permit free flow of fluid from right to left through the cylinder 25. However this cap 26 is normally maintained against the end of the cylinder 25 by a leaf spring 34 interposed between the cap 26 and the end portion of the outer casing 20.

The outer casing end cap 21 contains a port 35 communicating with the line 18, and surrounding this port on the inner side is a valve seat 36 which is adapted to be engaged by a poppet valve 37 formed on one side of a piston 38 which is reciprocable in the cylinder 25.

The rod 27, in addition to functioning as a guide for the end cap 26, also functions as a stop limiting leftward movement of the piston 38, and the piston is normally urged into contact with the rod 27 by a light, helical spring 40, which is compressed between the right side of the piston 38 and the end cap 21. The piston 38 may be provided with a sealing ring 38a for forming a seal with the cylinder 25, although in some instances it may be desirable to omit this seal to reduce the frictional drag of the piston.

It will be observed that the outer casing 20, the cylinder 25, and the cylinder end cap 26 define an outer chamber 45 which is in constant communication with the port 46 to which the line 16 connects. The space within the cylinder 25 is divided by the piston 38 into two compartments 50 and 51 respectively. The chamber 45 is communicated with the compartment 51 by an annular row of apertures 48 in the cylinder 25 adjacent the right end thereof, and the chamber 45 is communicated with the compartment 50 by a single aperture 49 in the end cap 26. Apertures 48 and 49 are identical in all respects, that is, they have the same cross-sectional shape and size and the same length. Therefore each individual aperture 48 has the same flow resistance properties as the aperture 49, regardless of the viscosity of the fluid. The flow from chamber 45 into compartment 50 relative to the flow from chamber 45 into compartment 51 is substantially proportional to the ratio of the number of the holes 48 to the number of the holes 49. In this connection it is to be noted that although only one hole 49 is shown in the drawing, more of these holes may be provided, depending upon the fluid flow characteristics that are desired. Ordinarily it is desired that the flow resistance from chamber 45 into compartment 50 be much greater than that from chamber 45 into compartment 51, so that only one aperture 49 is employed and a large number of apertures 48 are provided.

The device operates as follows:

The motor piston 13a is shown in its right limit position and the piston 38 of valve 14 is in its left end position resting against the rod 27. Now let it be assumed that the selector valve 12 is manipulated to apply pressure fluid to the line 16 and connect the line 15 to the exhaust line 17. Pressure fluid supplied through the line 16 enters the port 46 and the chamber 45. Pressure in chamber 45 aids the leaf spring 34 in holding the cap 26 against the end of the cylinder 25. A portion of the flow entering the chamber 45 leaves the chamber through the apertures 48 into the compartment 51 and thence flows out through the port 35 and through the line 18 to the right end of the motor cylinder 13 moving the piston 13a to the left. A smaller portion of the fluid entering the chamber 45 flows through the aperture 49 into the compartment 50, moving the piston 38 to the right. The movement of the piston displaces an equal amount of fluid from the compartment 51 so that the volume of fluid leaving the port 35 is the same as that entering the port 46. Piston 38 continues to move to the right until the valve portion 37 thereof seats against the valve seat 36, thereby positively blocking any further movement, and blocking all flow of fluid out through the port 35, so that the motor piston 13a is stopped intermediate the ends of its stroke, the position being determined by the distance the piston 38 had to travel from the stop rod 27 to the valve seat 36, and the ratio of the flow through the apertures 48 relative to that through the aperture 49.

In practice, the frictional resistance to movement of the piston 38 and the resistance afforded by the spring 40 is relatively small, so that the pressure drop between the compartment 50 and the compartment 51 is very small. Therefore the rate of fluid flow into compartment 50 bears a very definite ratio to the total volume of fluid flowing through the line 18 to the motor cylinder 13, the ratio being equal to the ratio of the number of the holes 49 to the number of the holes 48.

When it is desired to restore the motor piston 13a into its rightmost position, the selector valve 12 is manipulated to admit pressure fluid to the line 15 and connect the line 16 to the return line 17. Fluid thereupon flows through the line 15, through the motor cylinder 13, and through the line 18, and the port 35 into the compartment 51 of valve 20. This raises the pressure in compartment 51, urging the piston 38 to the left. This raises the pressure in the compartment 50, and if such pressure were not relieved, the piston 38 would be prevented from moving. However, any appreciable increase in pressure in the compartment 50 relative to that in the chamber 45 moves the end cap 26 away from the end of the cylinder 25, the end cap functioning as a check valve, to permit free flow of fluid from the compartment 50 into the chamber 45. This permits rapid leftward movement of the piston 38, since the relatively free passage past the end cap 26 offers much less resistance to flow than do the flow apertures 48. When the piston 38 has moved into contact with the stop rod 27, its movement is stopped and the end cap 26 is restored against the end of the cylinder 25 by the spring 34. Thereafter, further flow through the line 18 into the compartment 51 must escape into the chamber 45 through the apertures 48.

It is to be understood that for the purpose of showing the construction of the valve 14 the latter is depicted to a much larger scale than is the motor cylinder 13. In practice, the volumetric capacity of the valve 14 would be extremely small compared to the volumetric capacity of the cylinder 13, so that the full movement of the piston 38 from its right end (closed) position to its leftmost position in contact with the stop rod 27 would be accomplished with a very slight movement of the motor piston 13a. This permits the operator to cause the motor piston 13a to move a greater distance to the left than it was originally moved by simply momentarily manipulating the selector valve 12 to apply pressure fluid to the line 15 merely long enough to restore the valve piston 38 into its leftmost position and then again applying pressure fluid to the line 16. The leftward movement of the valve piston 38 was accompanied by a negligible rightward movement of the motor piston 13a whereas the rightward movement of the valve piston 38 is substantially proportional to the leftward movement of the motor piston 13a.

It is to be understood that the spring 40 is not essential and may be eliminated in some instances. It will be noted that there is always fluid connection through the aperture 49 and the apertures 48 between the opposite sides of the piston 38 so that if it were not restrained, either by friction or the force of the spring 40, it might drift away from the stop member 27.

Although for the purpose of explaining the invention, a particular embodiment thereof has been shown and described, obvious modifications will occur to a person skilled in the art, and I do not desire to be limited to the exact details shown and described.

I claim:

1. A fluid-metering shut-off valve comprising: a body defining a first fluid chamber and a first port connected thereto and a second fluid chamber and a second port connected thereto; a valve seat between said second chamber and said second port; a piston and valve assembly reciprocable in said second chamber and dividing it into a second compartment adjacent said seat and a first compartment remote from said seat, said assembly being reciprocable in response to different pressures in said two compartments between a first position remote from said seat and a second position in which it rests against said seat and blocks fluid flow from said second compartment to said second port; separate restricted passage means directly connecting said first chamber to said first compartment and to said second compartment respectively for providing a predetermined resistance to flow from said first chamber into said first compartment relative to the resistance to flow from said first chamber into said second compartment; and check valve means between said first compartment and said first chamber having substantially less resistance to flow from said first compartment to said first chamber than said restricted passage means from said second compartment to said first chamber.

2. A valve according to claim 1 in which said body comprises an outer casing and an inner casing, said first chamber being defined by the outer and inner casings and the second chamber being defined by the inner casing; and the inner casing comprising a fixed cylindrical wall and an end wall movable into and out of fluid sealing engagement with the end of the cylindrical wall; means guiding said end wall for axial movement against and away from said cylindrical wall; and spring means urging the end wall against the cylindrical wall, the end wall constituting said check valve means.

3. A valve according to claim 2 in which said means guiding said end wall comprises a rod supported by said outer casing and extending axially through an aperture in said end wall in sealing relation therewith.

4. A valve according to claim 3 in which said rod is adjustably supported in said outer casing for axial adjusting movement and the inner end of said rod within said cylindrical wall constitutes a stop limiting movement of said piston and valve assembly away from said seat.

5. A valve according to claim 4 in which said restricted passage means directly connecting said first chamber to said first compartment comprises an aperture in said end wall.

6. A fluid-metering shut-off valve comprising: a cup-shaped casing member having a first line port therein; a closure member closing said casing member and having a cylindrical wall extending into said casing member and a second line port within said cylindrical wall, said cylindrical wall defining a cylinder; an end wall member closing the inner end of said cylinder; said cylindrical wall and end wall member both being spaced from and defining with said casing member a first chamber in permanent free communication with said first port; a free piston in said cylinder dividing it into a first compartment adjacent said end wall member and a second compartment adjacent said closure member and in communication with said second port; said closure member having a valve seat surrounding said second port; a poppet on said piston movable into and out of engagement with said seat; said cylindrical wall having fluid-metering apertures therethrough adjacent its outer end; and said end wall having a fluid metering aperture therethrough.

References Cited in the file of this patent

UNITED STATES PATENTS

| | | |
|---|---|---|
| 236,151 | Furney | Jan. 4, 1881 |
| 244,882 | Furney | July 26, 1881 |
| 2,512,190 | Waterman | June 20, 1952 |
| 2,592,486 | Stark | Apr. 8, 1952 |
| 2,592,487 | Stark | Apr. 8, 1952 |